United States Patent
May, Jr. et al.

(10) Patent No.: US 7,649,898 B1
(45) Date of Patent: Jan. 19, 2010

(54) CONVERTING MEDIA STREAMS IN A COMMUNICATION SYSTEM

(75) Inventors: William B. May, Jr., Sunnyvale, CA (US); David J. Mackie, Brookdale, CA (US); Blane A. Eisenberg, Saratoga, CA (US); Philip R. Graham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 983 days.

(21) Appl. No.: 10/446,474

(22) Filed: May 27, 2003

(51) Int. Cl.
*H04L 12/28* (2006.01)
(52) U.S. Cl. ............................. 370/401; 370/466
(58) Field of Classification Search ......... 370/351–356, 370/401, 419, 420, 463, 466, 467, 469
See application file for complete search history.

(56) References Cited

U.S. PATENT DOCUMENTS

| | | | |
|---|---|---|---|
| 6,233,318 B1 | 5/2001 | Picard et al. | 379/88.17 |
| 6,272,127 B1 | 8/2001 | Golden et al. | 370/352 |
| 6,349,133 B1* | 2/2002 | Matthews et al. | 379/90.01 |
| 6,356,545 B1* | 3/2002 | Vargo et al. | 370/355 |
| 6,396,907 B1 | 5/2002 | Didcock | 379/88.17 |
| 6,452,924 B1 | 9/2002 | Golden et al. | 370/352 |
| 6,600,738 B1* | 7/2003 | Alperovich et al. | 370/352 |
| 6,618,368 B1* | 9/2003 | Tanigawa et al. | 370/352 |
| 6,654,367 B1* | 11/2003 | Kaufman | 370/356 |
| 7,075,919 B1* | 7/2006 | Wendt et al. | 370/352 |
| 7,349,352 B2* | 3/2008 | Vandermersch | 370/261 |
| 2002/0126626 A1* | 9/2002 | Singh et al. | 370/260 |
| 2002/0150082 A1* | 10/2002 | Celi, Jr. | 370/352 |
| 2004/0057420 A1* | 3/2004 | Curcio et al. | 370/352 |
| 2004/0215807 A1* | 10/2004 | Pinder et al. | 709/232 |

OTHER PUBLICATIONS

Cox, R.V.; Haskell, B.G.; LeCun, Y.; Shahraray, B.; Rabiner, L.; On the applications of multimedia processing to communications, May 1998, IEEE, Proceedings of the IEEE, vol. 86, pp. 755-824.*
RTP Voice Stream Multiplexing for IP Telephony Gateways, Sep. 14, 1998, IETF, retrieved from www.ietf.org/proceedings/98aug/slides/avt-hoshi-slides-98aug/index.html on Sep. 23, 2008.*

* cited by examiner

*Primary Examiner*—Jayanti K Patel
*Assistant Examiner*—Hooman Houshmand
(74) *Attorney, Agent, or Firm*—Baker Botts L.L.P.

(57) ABSTRACT

Converting a media stream includes communicating a call for a first system according to a first protocol. A media stream is retrieved from a second system, where the media stream communicated according to a second protocol distinguishable from the first protocol. The media stream is converted from the second protocol to the first protocol, and is associated with the call. The media stream is transmitted to the first system according to the first protocol.

13 Claims, 1 Drawing Sheet

US 7,649,898 B1

CONVERTING MEDIA STREAMS IN A COMMUNICATION SYSTEM

TECHNICAL FIELD OF THE INVENTION

This invention relates generally to the field of telecommunications and more specifically to converting media streams in a communication system.

BACKGROUND OF THE INVENTION

Communication systems typically include smaller systems that operate according to different protocols. Accordingly, communicating media streams from one system to another system may involve converting the streams between different protocols. Known techniques for converting media streams, however, may not be effective in converting between some protocols. Consequently, known techniques for converting media streams may be unsatisfactory in certain situations.

SUMMARY OF THE INVENTION

In accordance with the present invention, disadvantages and problems associated with previous techniques for converting media streams may be reduced or eliminated.

According to one embodiment of the present invention, converting a media stream includes communicating a call for a first system according to a first protocol. A media stream is retrieved from a second system, where the media stream communicated according to a second protocol distinguishable from the first protocol. The media stream is converted from the second protocol to the first protocol, and is associated with the call. The media stream is transmitted to the first system according to the first protocol.

Certain embodiments of the invention may provide one or more technical advantages. A technical advantage of one embodiment may be that a media stream may be converted from one protocol to another protocol. By performing this conversion, the media stream may, for example, be inserted into a call between communication devices.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
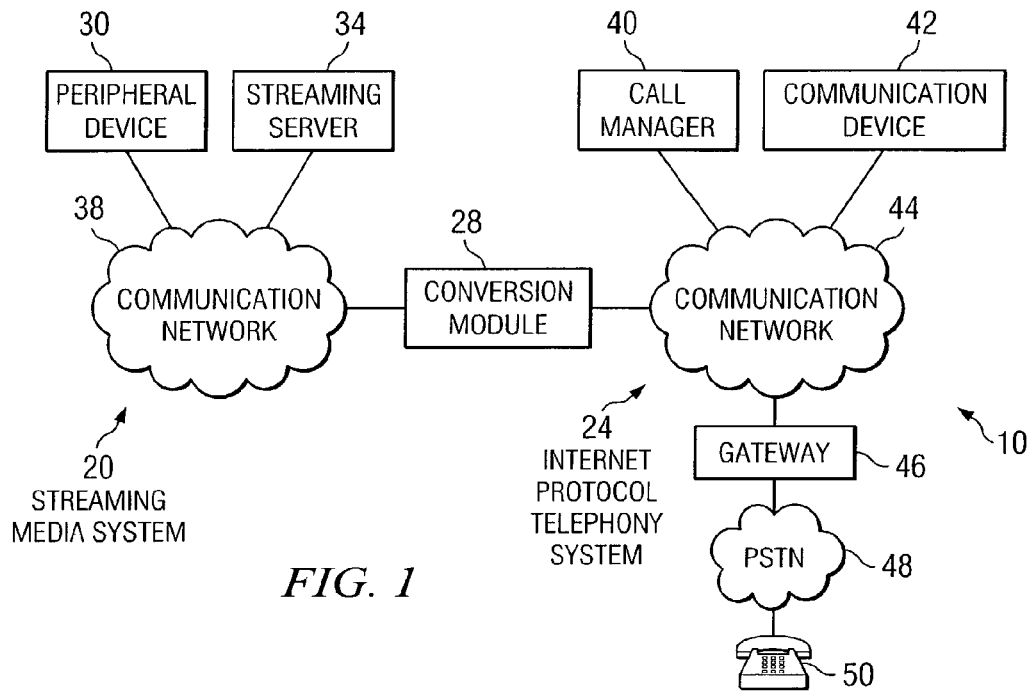
FIG. 1 is a block diagram illustrating one embodiment of a communication system that includes a conversion module operable to convert media streams.
Figure 2:
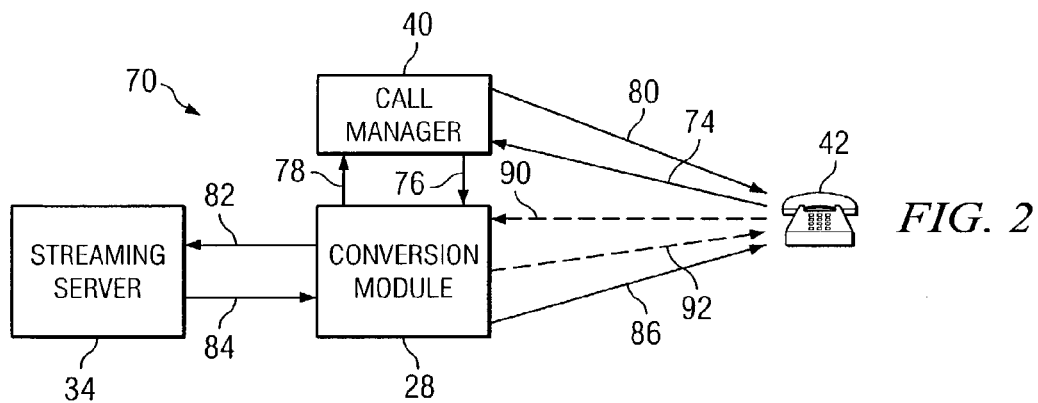
FIG. 2 is a diagram illustrating one embodiment of a method for converting data.
Figure 3:
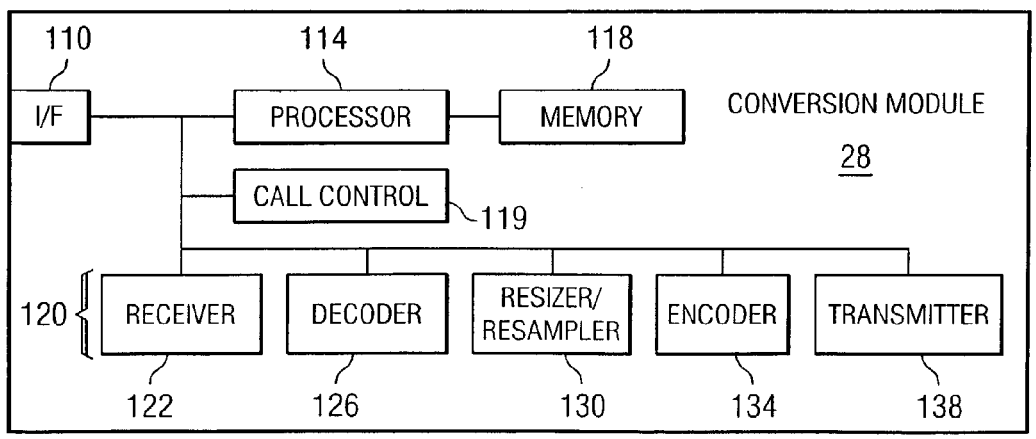
FIG. 3 is a block diagram illustrating one embodiment of a conversion module.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a communication system 10 that includes a conversion module operable to convert media streams. Communication system 10 may include systems that operate according to different protocols such as different codec or transport schemes. The conversion module may convert media streams between the different protocols.

According to the illustrated embodiment, communication system 10 includes a streaming media system 20 and an Internet Protocol (IP) telephony system 24 coupled to a conversion module 28 as illustrated in FIG. 1. Communication system 10 may include other or additional types of systems coupled to conversion module 28. According to one embodiment, systems 20 and 24 of communication system 10 may each have different control planes, data planes, or both. As an example, systems 20 and 24 may operate according to different protocols such as different codec, transport, or call control schemes.

Streaming media system 20 provides streaming media for communication system 10. "Streaming" refers to the transmission of data to a communication device that may play or decode the data as the data is received, without waiting until the entire file has been downloaded. Streaming media may comprise single or multiple media data, for example, audio data, video data, or both, and may include a live broadcast or an on-demand playback of pre-recorded data. The media streams may be unicast or multicast.

Streaming media system 20 may operate according to any suitable transport protocol such as transport protocols of the Internet Engineering Task Force (IETF) standards. The protocols may include the Realtime Transport Protocol (RTP) for streaming media, Real Time Streaming Protocol (RTSP), Moving Pictures Experts Group (MPEG) transport protocol, or other suitable protocol.

According to one embodiment, streaming media system 20 may include one or more peripheral devices 30 and a streaming server 34 coupled to a communication network 38 as illustrated in FIG. 1. Peripheral device 30 may comprise equipment that operates in conjunction with communication network 28 to provide communication services. Examples of peripheral devices 30 may include, for example, an Internet Voice on Demand (IVoD) device, a broadcast server, a transport stream device such as a MPEG-2 transport stream device, or any other device suitable for operating in conjunction with communication network 28 to provide communication services.

Streaming server 34 may comprise a streaming server 34 operable to provide streaming media for communication system 10 by, for example, encoding streaming media according to a streaming media protocol. Streaming server 34 may comprise a codec that operates according to any suitable streaming media codec protocol, for example, Moving Pictures Experts Group (MPEG) 1/2/4 for video data or MPEG Layer-3 (MP3), Advanced Audio Coding (AAC), or Dolby Digital (AC3) for audio data.

TABLE 1 illustrates examples of codec schemes and associated transport protocols that may be used by streaming server 34.

TABLE 1

| Codec | Transport Protocol |
| --- | --- |
| MPEG 4 video | RFC 3016 |
| MPEG ½ video | RFC 2250 |
| MP3 files | RFC 2250 or 3119 |
| AAC audio | RFC 3016 |

Communication network 38 allows streaming media system 20 to communicate with other networks or devices of communication system 10. Communication network 38 may comprise a public or private data network, the Internet, a wireline or wireless network, a local, regional, or global communication network, an enterprise intranet, other suitable communication link, or any combination of the preceding.

Internet Protocol telephony system 24 provides transmission of data packets according to the Internet Protocol. Internet Protocol telephony system 24 may operate according to any suitable control protocol such as the Signaling Connection Control Part (SCCP), H.323 protocol provided by the International Telecommunications Union (ITU), Session Initiation Protocol (SIP) provided by the Internet Engineering Task Force (IETF), or other suitable control protocol. Codecs of Internet Protocol telephony system 24 may operate according to any suitable protocol, for example, H.323 protocols such as H.261 or H.263 video protocols or G.711, G.722, G.723, G.728, or G.729 audio protocols.

TABLE 2 illustrates example codec schemes and associated transport protocols that may be used by Internet Protocol telephony system 24.

TABLE 2

| Codec | Transport Protocol |
| --- | --- |
| H.261 | RFC 2032 |
| H.263 or H.263+ | RFC 2190 or 2429 |
| G.711 | RFC 1890 |
| G.723 | RFC 1890 |
| G.729 | RFC 1890 |

According to the illustrated embodiment, Internet Protocol telephony system 24 includes a call manager 40 and one or more communication devices 42 coupled to a communication network 44 as illustrated in FIG. 1. Call manager 40 manages communication of data packets between communication network 44 and communication device 42.

Communication device 42 may comprise, for example, a cellular telephone, an IP telephone with video, audio, or both types of capabilities, or any other device suitable for communicating data packets to and from system 10. Communication device 42 may support, for example, simple Internet Protocol (IP), mobile IP, or any other suitable communication protocol. Communication device 42 may utilize, for example, General Packet Radio Service (GPRS) or any other suitable mobile communication technology. A call from communication device 42 may comprise data packets communicating information such as data, video, multimedia, any other suitable type of information, or any combination of the preceding.

Communication network 44 allows Internet Protocol telephony system 24 to communicate with other networks or devices of communication system 10. Communication network 44 may comprise a public or private data network, the Internet, a wireline or wireless network, a local, regional, or global communication network, an enterprise intranet, other suitable communication link, or any combination of the preceding. According to one embodiment, communication network 44 may comprise all or a portion of communication network 38.

A gateway 46 may be used to couple Internet Protocol telephony system 24 to a public switched telephone network 48 to allow communication between Internet Protocol telephony system 24 and PSTN device 50. Since public switched telephone network 48 uses circuit switching to communicate telephone calls, gateway 46 may convert between a circuit-switched signal for public switched telephone network 48 and digital data for Internet Protocol telephony system 24.

Conversion module 28 may convert media streams between different protocols used by different systems of communication system 10. "Conversion" may refer to modifying data streams that conform to one protocol so that the data streams conform to another protocol. The conversion may involve changes between codec protocols, transport protocols, call control protocols, or other suitable protocols. Conversion may involve transcoding media data from one protocol to another protocol, which may involve decoding data conforming to one protocol to yield raw data and encoding the raw data to conform to another protocol. Raw data may comprise data that carries information and that may be translated from one format to another format.

According to one embodiment, conversion module 28 may convert between a streaming media codec protocol and an Internet Protocol codec protocol, and may convert between a streaming media transport protocol, such as an Audio-Video Transport (AVT) protocol, and an Internet Protocol transport protocol. Conversion module 28, however, may convert data between any two suitable protocols. Conversion module 28 may also be configured to perform transcoding only in certain situations. For example, conversion module 28 may determine whether transcoding is needed and perform transcoding in response to the determination.

According to one embodiment, conversion module 28 may use appropriate control planes for different protocols to initiate communication sessions, communicate between different codecs, and transport media streams. As an example, conversion module 28 may initiate sessions with streaming media system 20 using a streaming media control plane such as Real Time Streaming Protocol (RTSP), Session Description Protocol (SDP), a proprietary protocol, or other suitable protocol, and may initiate sessions with Internet Protocol telephony system 24 using an Internet Protocol such as Signaling Connection Control Part (SCCP), Session Initiation Protocol (SIP), H.323 protocol, or other suitable protocol.

Conversion module 28 may transmit data between streaming media codecs operating according to Moving Pictures Experts Group (MPEG) 1/2/4 video protocol or MPEG Layer 3 (MP3) or MJPEG audio protocol and codecs operating according to an Internet Protocol such as H.261, H.263, or H263+ video protocol or G.711, G.723, or G.729 audio protocol.

Conversion module 28 may also translate data between different transport protocols such as Real Time Transport Protocol (RTP) over Real Time Streaming Protocol (RTSP), User Datagram Protocol (UDP), or other protocol for streaming media system 20 and Realtime Transport Protocol over user Datagram Protocol (UDP) or a proprietary protocol of Internet Protocol telephony system 24. Data may be converted between audio-visual transport protocols such as RFC 3016, 2250, or 3119, or other suitable transport protocol to an Internet Protocol telephony transport protocol such as RFC 2032, 2190, 2429, or 1890, or other suitable transport protocol.

As an example, in operation, conversion module 28 receives a media stream from streaming media system 20. The streaming media may be delivered according to any suitable format such as HyperText Transfer Protocol (HTTP) or Session Announcement Protocol (SAP) format, and the data may be sent according to Real Time Transport Protocol. The media stream may be converted by decoding the media stream to yield raw media data, and encoding the raw media data to yield telephony codec data. The raw media data may comprise pulse code modulation (PCM) audio data, Yuv formatted video data, or both. The telephony codec data may comprise data that can be transmitted according to Internet Protocol telephony protocols. According to one embodiment, conversion module 28 may replicate the media stream to multiple clients. Conversion module 28 may be used to, for example, inject a training video into a video conference. As another example, an IP mobile phone may receive a streaming broadcast. Conversion module 28 is described in more detail with reference to FIGS. 2 and 3.

Modifications, additions, or omissions may be made to communication system 10 without departing from the scope of the invention. Moreover, the operations of communication system 10 may be performed by more or fewer modules. For example, the operations of conversion module 28 may be performed by more than one module. Additionally, functions may be performed using any suitable logic comprising software, hardware, other logic, or any suitable combination of the preceding. As used in this document, "each" refers to each member of a set or each member of a subset of a set.

FIG. 2 is a diagram 70 illustrating one embodiment of a method for converting data. Diagram 70 shows communication between communication device 42, call manager 40, conversion module 28, and streaming server 34.

The method begins at step 74, where communication device 42 dials into call manager 40 to initiate a call session. Call manager 40 places a call to conversion module 28 at step 76. In response, conversion module 28 sends a ready response to call manager 40 at step 78. Call manager 40 sends a ready response to communication device 42 at step 80.

Conversion module 28 calls streaming server 34 at step 82. Streaming server 34 initiates transmission of streaming media to conversion module 28. Streaming media is transmitted to conversion module at step 84. Conversion module 28 converts the streaming media from a streaming media protocol to an Internet Protocol. The streaming media is sent to communication device 42 at step 86 to inject the streaming media into the call.

Modifications, additions, or omissions may be made to the method without departing from the scope of the invention. For example, call manager 40 may be omitted, and communication device 42 may communicate directly with conversion module 28. Communication device 42 may initiate a call with conversion module 28 at step 90. Conversion module 28 may send a ready response to communication device 42 at step 92 and then proceed to step 82. Additionally, steps may be performed in any suitable order without departing from the scope of the invention.

FIG. 3 is a block diagram illustrating one embodiment of conversion module 28. According to the illustrated embodiment, conversion module 28 includes an interface (I/F) 110, a processor 114, a memory 118, a call control 119, and other modules 120 coupled as shown in FIG. 3. Interface 110 receives and transmits signals. Processor 114 manages the operation of conversion module 28, and may comprise any suitable device operable to accept input, process the input according to predefined rules, and produce output.

Memory 118 stores data used by processor, and may include Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding. Call control 119 may set up one or more sessions, where each session is operable to handle a media stream. Each session may handle an audio stream, a video stream, or both.

Modules 120 may comprise logic such as software, hardware, or any suitable combination of software and hardware operable to perform conversion operations, and may include, for example, a receiver 122, a decoder 126, a resizer/resampler 130, an encoder 134, and a transmitter 138. Modules 120, however, may include fewer, more, or other modules. Modules 120 may be coupled to processor 114 using a bus connection or other suitable link.

Receiver 122 receives streaming data through interface 110, and may comprise, for example, an Ethernet controller, an Internet Protocol stack, a realtime protocol receiver, or other suitable component. The streaming data may be encoded according to one or more first protocols comprising protocols for streaming data such as Ethernet protocol, Internet Protocol, User Datagram Protocol, Real Time Transport Protocol, and codec specific Real Time Transport Protocol. Decoder 126 decodes the streaming data, and may comprise a streaming decoding engine such as an MPEG 1 Layer 3 audio decoder. Resizer/resampler 130 resizes and/or resamples the streaming data to prepare the data for encoding according to a second protocol such as an IP telephony protocol. Encoder 134 encodes the data according to the second protocol. Transmitter 138 transmits the encoded data to one or more destinations.

Modifications, additions, or omissions may be made to the system without departing from the scope of the invention. Moreover, the operations of the system may be performed by more or fewer modules. For example, the operations of resizer/resampler 130 and encoder 134 may be performed by one module, or the operations of resizer/resampler 130 may be performed by more than one module. Additionally, functions may be performed using any suitable logic comprising software, hardware, other logic, or any suitable combination of the preceding.

Certain embodiments of the invention may provide one or more technical advantages. A technical advantage of one embodiment may be that a media stream may be converted from one protocol to another protocol. By performing this conversion, the media stream may, for example, be inserted into a call between communication devices.

Although an embodiment of the invention and its advantages are described in detail, a person skilled in the art could make various alterations, additions, and omissions without departing from the spirit and scope of the present invention as defined by the appended claims.

What is claimed is:

1. A method for converting a media stream, comprising:
   interfacing, by a conversion module, through an Internet Protocol (IP) network with an IP system that is communicating a plurality of data packets of a call for a telephone according to a first protocol, the first protocol comprising an IP telephony protocol, the data packets communicating information;
   interfacing, by the conversion module, with a second system comprising a streaming media system comprising a streaming server operable to provide streaming pre-recorded data, the streaming server distinct from the conversion module and coupled to the conversion module through a communication network, the conversion module disposed between the communication network and the IP network;
   retrieving, by the conversion module, a media stream from the second system, the media stream communicated as streaming media codec data according to a second protocol distinguishable from the first protocol, the second protocol comprising a streaming media protocol, the media stream comprising the streaming pre-recorded data;
   converting, by the conversion module, the media stream from the second protocol to the first protocol by:

decoding the streaming media codec data according to the second protocol to yield raw media data; and encoding the raw media data according to the first protocol to yield Internet Protocol codec data; and transmitting the media stream encoded as the Internet Protocol codec data from the conversion module to the telephone to insert the media stream into the call after the data packets communicating information.

2. The method of claim 1, wherein converting the media stream from the second protocol to the first protocol comprises:

decoding the media stream according to the second protocol to yield raw data; and encoding the raw data according to the first protocol.

3. The method of claim 1, wherein converting the media stream from the second protocol to the first protocol comprises converting the media stream from a second transport protocol of the second protocol to a first transport protocol of the first protocol.

4. A system for converting a media stream, comprising:

a first interface operable to interface through an Internet Protocol (IP) network with an IP system that is communicating a plurality of data packets of a call for a telephone according to a first protocol, the first protocol comprising an IP telephony protocol, the data packets communicating information; and a second interface operable to interface with a second system comprising a streaming media system comprising a streaming server operable to provide streaming pre-recorded data, the streaming server distinct from the conversion module and coupled to the conversion module through a communication network, the conversion module disposed between the communication network and the IP network; and a processor coupled to the interface and operable to:

retrieve a media stream from the second system, the media stream communicated as streaming media codec data according to a second protocol distinguishable from the first protocol, the second protocol comprising a streaming media protocol, the media stream comprising the streaming pre-recorded data;

convert the media stream from the second protocol to the first protocol by:

decoding the streaming media codec data according to the second protocol to yield raw media data; and encoding the raw media data according to the first protocol to yield Internet Protocol codec data;

transmit the media stream encoded as the Internet Protocol codec data from the conversion module to the telephone to insert the media stream into the call after the data packets communicating information.

5. The system of claim 4, wherein the processor is operable to convert the media stream from the second protocol to the first protocol by:

decoding the media stream according to the second protocol to yield raw data; and encoding the raw data according to the first protocol.

6. The system of claim 4, wherein the processor is operable to convert the media stream from the second protocol to the first protocol by converting the media stream from a second transport protocol of the second protocol to a first transport protocol of the first protocol.

7. The system of claim 4, wherein the processor is operable to convert the media stream from the second protocol to the first protocol by converting the media stream from a second codec protocol of the second protocol to a first codec protocol of the first protocol.

8. One or more computer-readable storage media storing software that when executed by a computer is operable to:

interface, by a conversion module, through an Internet Protocol (IP) network with an IP system that is communicating a plurality of data packets of a call for a telephone according to a first protocol, the first protocol comprising an IP telephony protocol, the data packets communicating information;

interface, by the conversion module, with a second system comprising a streaming media system comprising a streaming server operable to provide streaming pre-recorded data, the streaming server distinct from the conversion module and coupled to the conversion module through a communication network, the conversion module disposed between the communication network and the IP network;

retrieve, by the conversion module, a media stream from the second system, the media stream communicated as streaming media codec data according to a second protocol distinguishable from the first protocol, the second protocol comprising a streaming media protocol, the media stream comprising the streaming pre-recorded data;

convert, by the conversion module, the media stream from the second protocol to the first protocol by:

decoding the streaming media codec data according to the second protocol to yield raw media data; and encoding the raw media data according to the first protocol to yield Internet Protocol codec data; and transmit the media stream encoded as the Internet Protocol codec data from the conversion module to the telephone to insert the media stream into the call after the data packets communicating information.

9. The logic of claim 7, operable to convert the media stream from the second protocol to the first protocol by:

decoding the media stream according to the second protocol to yield raw data; and encoding the raw data according to the first protocol.

10. The logic of claim 8, operable to convert the media stream from the second protocol to the first protocol by converting the media stream from a second transport protocol of the second protocol to a first transport protocol of the first protocol.

11. The logic of claim 8, operable to convert the media stream from the second protocol to the first protocol by converting the media stream from a second codec protocol of the second protocol to a first codec protocol of the first protocol.

12. A system for converting a media stream, comprising:

means for interfacing, by a conversion module, through an Internet Protocol network with an IP (IP) system that is communicating a plurality of data packets of a call for a telephone according to a first protocol, the first protocol comprising an IP telephony protocol, the data packets communicating information;

means for interfacing, by the conversion module, with a second system comprising a streaming media system comprising a streaming server operable to provide streaming pre-recorded data, the streaming server distinct from the conversion module and coupled to the conversion module through a communication network, the conversion module disposed between the communication network and the IP network;

means for retrieving, by the conversion module, a media stream from the second system, the media stream communicated as streaming media codec data according to a second protocol distinguishable from the first protocol, the second protocol comprising a streaming media protocol, the media stream comprising streaming pre-recorded data;

means for converting, by the conversion module, the media stream from the second protocol to the first protocol by:
  decoding the streaming media codec data according to the second protocol to yield raw media data; and
  encoding the raw media data according to the first protocol to yield Internet Protocol codec data; and means for transmitting the media stream encoded as the Internet Protocol codec data from the conversion module to the telephone to insert the media stream into the call after the data packets communicating information.

13. A method for converting a media stream, comprising:

interfacing, by a conversion module, through an Internet Protocol (IP) network with an IP system that is communicating a plurality of data packets of a call for a telephone according to a first protocol comprising an IP telephony protocol, the data packets communicating information;

interfacing, by the conversion module, with a second system comprising a streaming media system comprising a streaming server operable to provide streaming pre-recorded data, the streaming server distinct from the conversion module and coupled to the conversion module through a communication network, the conversion module disposed between the communication network and the IP network;

retrieving, by the conversion module, a media stream from the second system, the media stream communicated as streaming media codec data according to a second protocol comprising a streaming media protocol distinguishable from the first protocol, the media stream comprising the streaming pre-recorded data;

converting, by the conversion module, the media stream from the second protocol to the first protocol by decoding the streaming media codec data according to the second protocol to yield raw media data, and encoding the raw media data according to the first protocol to yield Internet Protocol codec data by:
  decoding the media stream according to the second protocol to yield raw data, and encoding the raw data according to the first protocol;
  converting the media stream from a second transport protocol of the second protocol to a first transport protocol of the first protocol; and
  converting the media stream from a second codec protocol of the second protocol to a first codec protocol of the first protocol; and transmitting the media stream encoded as the Internet Protocol codec data from the conversion module to the telephone to insert the media stream into the call after the data packets communicating information.

* * * * *

UNITED STATES PATENT AND TRADEMARK OFFICE
CERTIFICATE OF CORRECTION

PATENT NO. : 7,649,898 B1 Page 1 of 1
APPLICATION NO. : 10/446474
DATED : January 19, 2010
INVENTOR(S) : May, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Twenty-third Day of November, 2010

David J. Kappos
*Director of the United States Patent and Trademark Office*